United States Patent
Wetterau

(10) Patent No.: US 11,377,052 B2
(45) Date of Patent: Jul. 5, 2022

(54) CONTROL OF AN ELECTRIC CIRCUIT IN A MOTOR VEHICLE

(71) Applicant: ZF Friedrichshafen AG, Friedrichshafen (DE)

(72) Inventor: Michel Wetterau, Meersburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 249 days.

(21) Appl. No.: 16/686,469

(22) Filed: Nov. 18, 2019

(65) Prior Publication Data

US 2020/0156572 A1 May 21, 2020

(30) Foreign Application Priority Data

Nov. 19, 2018 (DE) ...................... 10 2018 219 745.8

(51) Int. Cl.
| | |
|---|---|
| *B60R 16/03* | (2006.01) |
| *H02P 29/40* | (2016.01) |
| *B60W 30/188* | (2012.01) |
| *H02H 3/20* | (2006.01) |

(52) U.S. Cl.
CPC ......... *B60R 16/03* (2013.01); *B60W 30/1886* (2013.01); *H02H 3/207* (2013.01); *H02P 29/40* (2016.02); *B60W 2540/106* (2013.01)

(58) Field of Classification Search
CPC .............. B60R 16/03; B60W 30/1886; B60W 2540/106; H02H 3/207; H02H 3/243; Y02T 10/92; H02P 9/48; H02J 1/14
See application file for complete search history.

(56) References Cited

U.S. PATENT DOCUMENTS

| | | | | |
|---|---|---|---|---|
| 6,208,931 | B1 * | 3/2001 | Schoettle .......... | B60W 50/0097 |
| | | | | 701/115 |
| 9,126,498 | B2 * | 9/2015 | Weβ ........................ | B60L 1/003 |
| 2004/0232769 | A1 | 11/2004 | Pickering | |
| 2005/0240325 | A1 | 10/2005 | Mayer et al. | |
| 2017/0187319 | A1 | 6/2017 | Ozawa et al. | |

FOREIGN PATENT DOCUMENTS

| | | |
|---|---|---|
| DE | 102004019774 A1 | 11/2005 |
| DE | 102009027593 A1 | 1/2011 |
| DE | 102013006092 A1 | 10/2014 |
| DE | 102014007548 A1 | 11/2015 |
| DE | 102016214112 A1 * | 2/2018 ................ H02J 1/14 |
| DE | 102016214112 A1 | 2/2018 |
| DE | 102016123063 A1 | 5/2018 |
| WO | WO 2011/003813 | 1/2011 |
| WO | WO 2015/176786 | 11/2015 |

OTHER PUBLICATIONS

German Search Report DE102018219745.8, dated Aug. 6, 2019. (12 pages).

* cited by examiner

*Primary Examiner* — Marthe Y Marc-Coleman
(74) *Attorney, Agent, or Firm* — Dority & Manning, P.A.

(57) ABSTRACT

A method (200) for operating an electrical vehicle circuit (115) of a motor vehicle (105) includes determining that a voltage of the vehicle circuit (115) drops below a predetermined threshold value while electric current from the vehicle circuit (115) flows through a consumer (130) on board the motor vehicle (105), lowering a voltage present at the consumer (130) in order to reduce the current flowing through the consumer (130), and successively raising the voltage present at the consumer (130).

10 Claims, 2 Drawing Sheets

CONTROL OF AN ELECTRIC CIRCUIT IN A MOTOR VEHICLE

CROSS-REFERENCE TO RELATED APPLICATION

The present application is related and has right of priority to German Patent Application No. 10 2018 219 745.8 filed on Nov. 19, 2018, the entirety of which is incorporated by reference for all purposes.

FIELD OF THE INVENTION

The present invention relates generally to a vehicle circuit of a motor vehicle. In particular, the invention relates to the open-loop control of an electrical consumer connected to the vehicle circuit.

BACKGROUND

A vehicle circuit of a motor vehicle is configured for providing a predetermined voltage for a plurality of electrical consumers. If current flows through multiple low-resistance consumers, the voltage of the vehicle circuit can drop. A safety-critical component, which is connected to the vehicle circuit as a consumer, for example, an electric steering aid or an electro-mechanical clutch actuation, can operate safely only above a predetermined voltage. A non-safety-critical consumer, therefore, is to receive less current, preventively, if the voltage in the vehicle circuit is dangerously low.

For this purpose, the voltage at the non-safety-critical consumer can be gradually lowered until it consumes a sufficiently low current. Control oscillations must be avoided, for example, if multiple consumers are controlled by an open-loop system in a similar way. Nevertheless, the reduction of the current through the consumer must take place within a predefined time, for example, in the range of approximately ten milliseconds (10 ms). An appropriate control method can be complex and a control device can require costly components.

US 2017 187 319 relates to a technique for temporarily switching off a consumer of an electrical supply network in the case of an overload of the network.

DE 10 2016 214 112 A1 provides that a consumer in a vehicle circuit is operated with reduced power if a voltage of the vehicle circuit falls below a predetermined threshold value.

DE 10 2016 123 063 A1 describes a sequence-controlled distribution of current to various loads in a vehicle circuit.

DE 10 2014 007 548 A1 provides that multiple consumers in a vehicle circuit may each check themselves to determine whether a power supply voltage falls below a predetermined threshold value. If this is the case, the particular consumer can reduce its power consumption itself.

SUMMARY OF THE INVENTION

One example object of the invention is to provide an improved technique for the control by way of an open-loop system of a vehicle circuit of a motor vehicle.

A method for operating an electrical vehicle circuit of a motor vehicle includes: determining that a voltage of the vehicle circuit drops below a predetermined threshold value, while electric current from the vehicle circuit flows through a consumer on board the motor vehicle; lowering a voltage present at the consumer in order to reduce the current flowing through the consumer; and continuously raising the voltage present at the consumer at a predetermined rate of change.

The consumer preferably has a voltage-dependent current draw. The consumer can be an essentially ohmic consumer, for example, in the form of an electric heater for a window pane, a mirror, or an interior space. The consumer can also be essentially inductive and, for example, include a drive motor for an air-conditioning compressor, a pump, or a servomotor. It is further preferred when the consumer is a non-safety-relevant consumer, which can be operated, at least briefly, in a limited manner, without adversely affecting a safety-relevant function, in particular a longitudinal or transverse control or an accident avoidance or safety system.

By lowering the voltage at the consumer, the vehicle circuit can be rapidly relieved, so that the voltage of the vehicle circuit can lie above the threshold value again. The successive raising of the voltage at the consumer can be easier to control than a known successive lowering. The provided open-loop control can be robust against a control oscillation or other undesirable control effects, which can load or contaminate the voltage of the vehicle circuit.

The voltage present at the consumer can be lowered by a predetermined amount or to a predetermined value. The lowering preferably takes place abruptly, i.e., as rapidly as possible. Thereafter, the voltage present at the consumer can be raised from zero or a value close to zero. In this way, the vehicle circuit can be sustainably relieved. The consumer can be operated in a voltage range, in which a current draw of the consumer can be covered by the vehicle circuit without the power supply voltage exceeding the threshold value.

In this way, it can also be brought about that the consumer remains essentially shut off if the voltage of the vehicle circuit does not yet exceed the threshold value as a result of the reduction of the voltage at the consumer. In this case, a wait can automatically ensue until the voltage increases above the threshold value again, for example, due to another switched-off consumer or an increased supply of electrical energy.

The raising of the voltage can take place continuously or in multiple discrete steps. In the case of a discrete raising, preferably more than three (3), further preferably more than approximately ten (10) steps are utilized. The number of steps can be so great that this can be practically referred to as a continuous raising. This can be the case, for example, with approximately one hundred (100) steps or two hundred (200) steps.

The voltage at the consumer can be raised until the current flowing through the consumer reaches a predetermined value. In this way, an additional termination condition for the raising of the voltage can be determined. If there is at least one condition, which prevents a further raising, the voltage at the consumer can be held constant. The predetermined value can be static or can be dynamically determined, for example, as a function of the voltage of the vehicle circuit or as a function of a current flowing through another consumer.

The voltage present at the consumer can preferably be raised only if the voltage of the vehicle circuit is above the threshold value by at least a predetermined amount. In this way, it can be prevented that the consumer takes up so much current that the voltage of the vehicle circuit reaches the range of the threshold value again, so that a further lowering of the voltage of the consumer could be necessary. The predetermined amount is usually in a range from approximately a tenth of a volt (0.1 V) to approximately one volt (1 V).

The voltage at the consumer can be raised at most to a predetermined value. The predetermined value is usually in the range of a rated voltage or an actual voltage of the vehicle circuit. In the case of open-loop control of the consumer with the aid of a semiconductor, the voltage present at the consumer can be below the power supply voltage by a typical semiconductor voltage of, for example, four-tenths of a volt (0.4 V) or seven-tenths of a volt (0.7 V).

A maximum amount of current flowing through the consumer can exceed a predetermined value. In other words, this is preferably a consumer, which can take up a large amount of current from the vehicle circuit. The determined value can be appropriately selected, also dynamically, in order to select the consumer in a reasonable way. A method described herein can be carried out for multiple consumers, in particular for all consumers having a predetermined current draw.

According to a further example aspect of the invention, a control device for an electrical vehicle circuit of a motor vehicle includes:

a voltage controller for providing a voltage for a consumer from the vehicle circuit;

a scanning unit for determining a voltage of the vehicle circuit; and a processing unit, which is configured for determining that a predetermined threshold value has been fallen below by the voltage of the vehicle circuit, lowering the voltage provided to the consumer in order to reduce a current flowing from the vehicle circuit through the consumer, and successively raising the voltage provided to the consumer, provided the voltage of the vehicle circuit is above the threshold value.

The processing unit can be configured for entirely or partially carrying out a method described herein. For this purpose, the processing unit can include a programmable microcomputer or microcontroller and the method can be present in the form of a computer program product including program code. The computer program product can also be stored on a computer-readable data carrier. Features or advantages of the method can be transferred to the device, and vice versa.

The control device can also include a further scanning unit for determining a current flowing through the consumer. The processing unit can be configured for controlling, by way of an open-loop system, the voltage present at the consumer as a function of the current flowing through the consumer. In particular, the voltage at the consumer can be raised only if the current flowing through the consumer is below a predetermined value. This value can be determined as a function of a voltage of the vehicle circuit, before or after the determination of an undervoltage.

BRIEF DESCRIPTION OF THE DRAWINGS

Example aspects of the invention will now be described more precisely with reference to the attached figures, in which.

DETAILED DESCRIPTION

Figure 1:
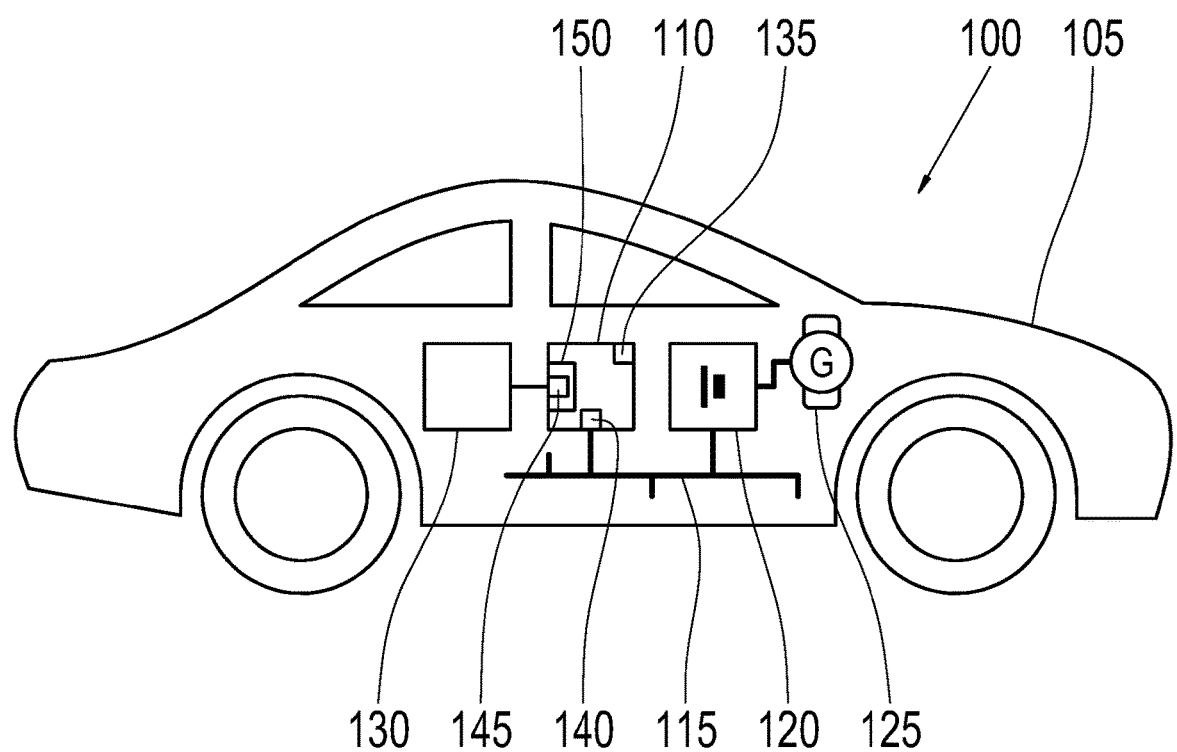
FIG. 1 shows a system according to an example embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a system 100, which encompasses a motor vehicle 105 and a control device 110. An electrical vehicle circuit 115 is provided on board the motor vehicle 105, which is usually supplied from a chargeable energy accumulator 120 and/or a generator 125, which can be driven, for example, by a drive motor. The vehicle circuit 115 is configured for providing current of a predetermined voltage, the power supply voltage, to one or multiple consumers 130 on board the motor vehicle 105. The power supply voltage is usually a DC voltage having a nominal value of, for example, approximately twelve volts (12 V). A valid range of the power supply voltage can lie in a predetermined range around the nominal value, for example, approximately no less than eleven and eight-tenths of volt and no greater than twelve and three-tenths of volt (11.8 V-12.3 V). An undervoltage of the power supply voltage can be tolerated up to a predetermined threshold value, which is usually below the aforementioned range. If the power supply voltage should fall below the threshold value, it is provided to reduce an electrical load on the vehicle circuit 115. A typical threshold value in the case of a nominal power supply voltage of twelve volts (12 V) is approximately eleven volts (11 V).

A consumer 130 represented by way of example can be controlled, by way of an open-loop system, with the aid of the control device 110, in that a voltage present at the consumer 130 can be changed. The consumer 130 has a voltage-dependent current draw and is usually configured for drawing a substantial amount of electrical energy from the vehicle circuit 115. The consumer 130 considered in this case is preferably not safety-critical; the motor vehicle 105 can therefore be safely operated even if the consumer 130 operates, at least briefly, only with reduced power or not at all. During normal operation, the consumer 130 is usually operated directly from the power supply voltage of the vehicle circuit 115. If the consumer 130 should internally require a voltage higher than the power supply voltage, it is assumed in this case that the consumer 130 includes an appropriate voltage converter (step-up converter).

The control device 110 preferably includes a processing device 135, further preferably a first scanning unit 140 for scanning a voltage of the vehicle circuit 115, such as a voltage sensor, and/or a second scanning unit 145 for scanning a current flowing through the consumer 130, such as a current sensor. The control device 110 also includes a voltage controller 150, which is configured for controlling, by way of an open-loop system, a voltage present at the consumer 130 continuously or in discrete steps, in order to influence a current flowing through the consumer 130.

It is provided that the control device 110 sharply reduces the voltage present at the consumer 130 as soon as the power supply voltage of the vehicle circuit 115 drops below an aforementioned, predetermined threshold value. Thereafter, the voltage at the consumer 130 is to be successively raised. However, the raising should take place only to the point at which one or multiple predetermined conditions are met. Such a condition can be that the power supply voltage is above a further predetermined threshold value, which can be slightly above the aforementioned threshold value. Another condition can be met, provided a current flowing through the consumer 130 does not exceed a predetermined threshold value. This threshold value can be determined as a function of the power supply voltage before or after the determination of the undervoltage.

Figure 2:
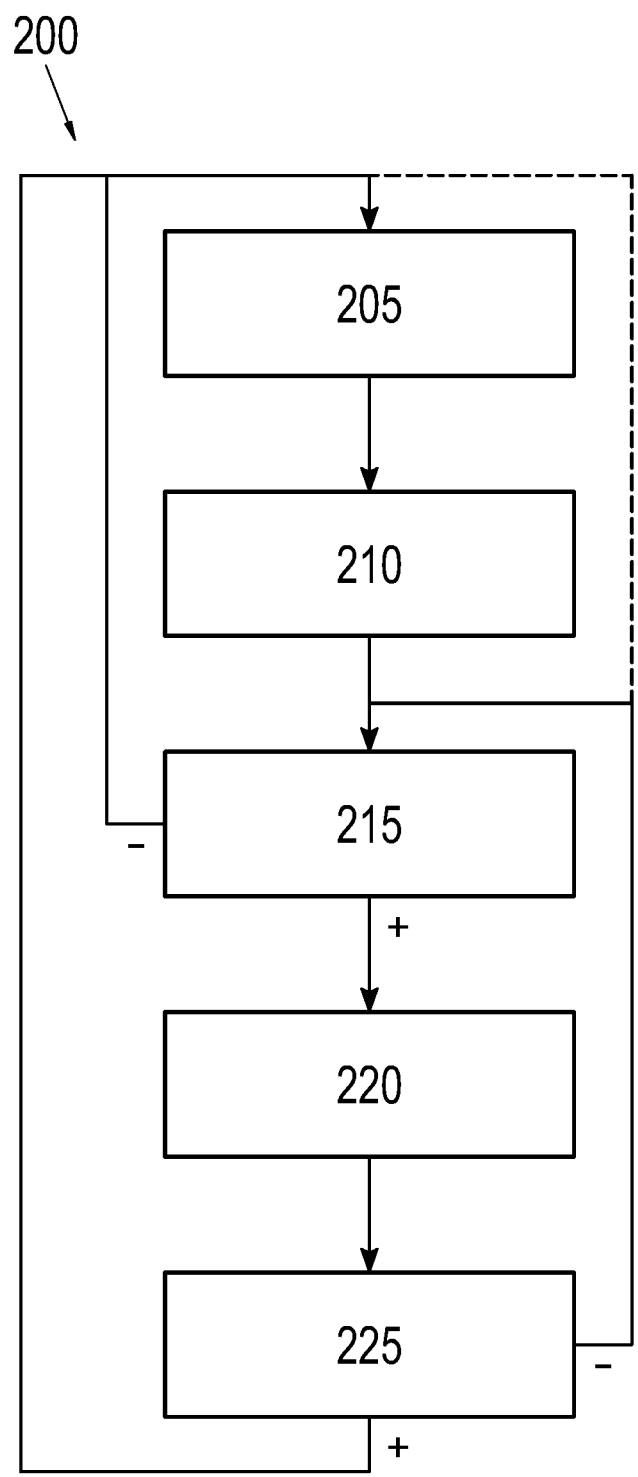
FIG. 2 shows a flow chart of a method according to an example embodiment.

FIG. 2 shows a flow chart of a method 200 for the control, by way of an open-loop system, of a consumer 130, which is mounted on board a motor vehicle 130 and is supplied with electrical energy from a vehicle circuit 115. The method 200 can be carried out, in particular, with the aid of a control device 110.

In a step 205, it can be determined that the voltage of a vehicle circuit 115 is below a predetermined threshold value. This is also referred to as an undervoltage of the vehicle circuit 115. If the power supply voltage of the vehicle circuit 115 is above the threshold value, the step 205 can be repeated any number of times.

If the power supply voltage is below the threshold value, in a step 210, a voltage present at the consumer 130 can be reduced. The reduction preferably takes place by at least fifty percent (50%), preferably at least eighty percent (80%), and in a further preferred embodiment by one hundred percent (100%), i.e., corresponding to a shut-off of the consumer 130. After the reduction, a wait for a predetermined time can ensue before the next step is carried out. The predetermined time can be fixedly associated with the consumer 130. If multiple consumers 130 connected to the vehicle circuit 115 are controlled, by way of an open-loop system, in a way described herein, the predetermined times can be selected, in particular, to be different, so that the following steps can be carried out staggered in time for the various consumers 130.

In a subsequent step 215, one or multiple criteria can be checked. The criterion indicates whether the voltage present at the consumer 130 can be raised or not. A possible criterion is met if the current flowing from the vehicle circuit 115 through the consumer 130 is below a predetermined threshold value. Another possible criterion is met if the voltage of the vehicle circuit 115 is above a predetermined threshold value, which can be above the threshold value in step 205.

If at least one of the checked criteria is not met, the method 200 can end or start over from the beginning. Otherwise, if all criteria have been met, the voltage present at the consumer 130 can be raised in a step 220. The raising preferably takes place by a predetermined amount, which can be, for example, in the range of approximately a tenth of a volt (0.1 V). The voltage can also be continuously raised, for example, at a predetermined rate of change.

In a step 225, a check can then be carried out to determine whether the voltage present at the consumer 130 has reached a predetermined value. This value can correspond, in particular, to the power supply voltage or can be below this by a predetermined amount. The value can also be fixedly predetermined, however. If the value has been reached, the power reduction of the consumer 130 can be considered to have ended. The method 200 can end or start over.

Otherwise, if the voltage at the consumer 130 has not reached the value, the consumer 130 is operated further with reduced voltage and, therefore, with reduced current. In this case, the method 200 can return to step 215, in order to check a possible raising of the voltage. The method 200 can also return to the start, however, in order to check in advance whether another reduction of the voltage is necessary.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 100 system
105 motor vehicle
110 control device
115 electrical vehicle circuit
120 energy accumulator
125 generator
130 consumer
135 processing device
140 first scanning unit (voltage of the vehicle circuit)
145 second scanning unit (current through the consumer)
150 voltage controller
200 method
205 determine undervoltage
210 lower voltage at the consumer
215 criterion met?
220 raise voltage
225 voltage normal?

The invention claimed is:

1. A method (200) for operating an electrical vehicle circuit (115) of a motor vehicle (105), comprising:
   determining (205) that a voltage of the vehicle circuit (115) is below a predetermined threshold value while electric current from the vehicle circuit (115) flows through a consumer (130) on board the motor vehicle (105);
   lowering (210) a voltage present at the consumer (130) in order to reduce the current flowing through the consumer (130); and
   continuously raising (220) the voltage present at the consumer (130) at a predetermined rate of change.

2. The method (200) of claim 1, wherein the continuously raising (220) comprises continuously raising (220) the voltage present at the consumer (130) when the voltage of the vehicle circuit (115) is above the predetermined threshold value.

3. The method (200) of claim 1, wherein the continuously raising (220) comprises continuously raising (220) the voltage present at the consumer (130) from a value of about zero.

4. The consumer (200) of claim 1, wherein the continuously raising (220) comprises continuously raising (220) the voltage present at the consumer (130) until the current flowing through the consumer (130) reaches a predetermined value.

5. The method (200) of claim 1, wherein the continuously raising (220) comprises continuously raising (220) the voltage present at the consumer (130) only when the voltage of the vehicle circuit (115) is greater than the predetermined threshold value by a predetermined amount.

6. The method (200) of claim 1, wherein the continuously raising (220) comprises continuously raising (220) the voltage present at the consumer (130) at most to a predetermined value.

7. The method (200) of claim 1, wherein a maximum current flowing through the consumer (130) exceeds a predetermined value.

8. A control device (110) for an electrical vehicle circuit (115) of a motor vehicle (105), comprising:
- a voltage controller (150) for providing a voltage for a consumer (130) from the vehicle circuit (115);
- a scanning unit (140) for determining a voltage of the vehicle circuit (115); and
- a processing unit (135) configured for
  - determining that the voltage of the vehicle circuit (115) has fallen below a predetermined threshold value,
  - lowering the voltage provided to the consumer (130) in order to reduce a current flowing from the vehicle circuit (115) through the consumer (130), and
  - continuously raising the voltage provided to the consumer (130) at a predetermined rate.

9. The control device (110) of claim 8, wherein the processing unit (135) configured for continuously raising the voltage provided to the consumer (130) when the voltage of the vehicle circuit (115) is above the threshold value.

10. The control device (110) of claim 8, further comprising an additional scanning unit (145) for determining the current flowing through the consumer (130).

\* \* \* \* \*